May 12, 1964   C. A. DAMM   3,132,889
SUSPENSION APPARATUS
Original Filed Dec. 29, 1959   3 Sheets-Sheet 1

INVENTOR.
CARL A. DAMM

INVENTOR.
CARL A. DAMM

May 12, 1964 C. A. DAMM 3,132,889
SUSPENSION APPARATUS
Original Filed Dec. 29, 1959 3 Sheets-Sheet 3

INVENTOR.
CARL A. DAMM

United States Patent Office 3,132,889
Patented May 12, 1964

3,132,889
SUSPENSION APPARATUS
Carl A. Damm, Upper Black Eddy, Pa., assignor to the United States of America as represented by the Secretary of the Navy
Original application Dec. 29, 1959, Ser. No. 862,726, now Patent No. 3,093,031. Divided and this application Sept. 28, 1962, Ser. No. 227,676
6 Claims. (Cl. 294—83)
(Granted under Title 35, U.S. Code (1952), sec. 266)

The invention herein disclosed may be manufactured and used by or for the Government of the United States of America for governmental purposes without the payment of any royalties thereon or therefor.

This application is a division of application Serial No. 862,726, filed December 29, 1959, now Patent No. 3,093,031, for Universal Store Suspension Apparatus.

This invention relates to a universal store suspension apparatus for use in suspending a store and more particularly to a universal store suspension apparatus of singular design adapted for handling different types of stores in various types of aircraft.

The invention is especially suitable for handling a bomb in an aircraft. Due to the large differences in bomb size, shape and structural appendages, and the peculiar requirements of each of numerous aircraft facilities currently available for receiving, carrying, and dispensing bombs, there has developed a need for a similarly large number of variations in suspension apparatus. These variations have been increased even more with the advent of thermonuclear weapons of the type having no bomb lugs by which the bomb can be attached to conventional bomb racks.

The consequences of the condition of accumulative variations in suspension apparatus are obviously disadvantageous from an economic and a military operational standpoint. Additionally, prior art suspension apparatus known in the art possess objectional features unique to themselves. In order to alleviate the many disadvantages and limitations arising out of the design practice heretofore applied, it is essential that the suspension apparatus be of singular construction or configuration capable of universal application for all types of bombs and aircraft facilities for hoisting, carrying, and releasing the bomb.

Other important factors in such a suspension apparatus need to be considered especially on aircraft carriers where armament time must be maintained at a minimum. It has been established that it is preferable that suspension apparatus be installable while the bomb is in storage in the carrier magazine. Weight and size of the apparatus is critical as it will also govern payload size and aircraft range. The apparatus should not free any other hardware upon releasing a bomb so that a hazard is created by hardware falling among a closely-packed formation of aircraft. The apparatus, further, must not introduce heavy impact forces against the aircraft structure during launching of the bomb. Another vital consideration is that the apparatus include reliable means for quickly releasing the bomb at a mandatory point in time.

It is, therefore, an object of the present invention to provide a novel universal store suspension apparatus adapted for hoisting, securing, and releasing different stores including the lugless type in different types of aircraft.

Another object of the invention is the provision of a unique store suspension apparatus which can be easily and quickly installed on a store such as a bomb.

A still further object of the invention is the provision of an improved and reliable quick release mechanism for use in a suspension apparatus for releasing and dispensing a store from an aircraft.

These and other objects and many of the attendant advantages of the present invention will be readily appreciated as the same become better understood by reference to the following detailed description when considered in connection with the accompanying drawings, wherein:

FIG. 1 diagrammatically illustrates an elevational end view of a bomb secured in an aircraft bomb bay by a universal store suspension apparatus;

Figure 1:
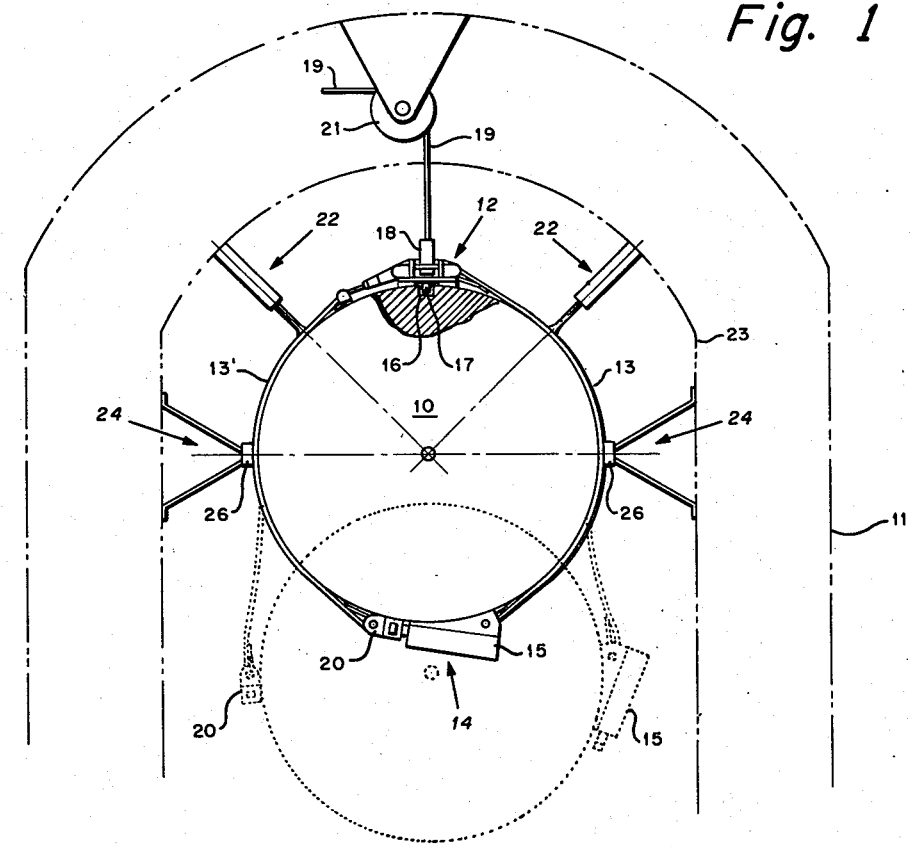

Referring to the drawings, wherein like reference characters designate like or corresponding parts throughout the several views, there is shown in FIG. 1 a front view of a bomb 10 suspended in the bomb bay of an aircraft fuselage 11, shown in hidden outline.

Figure 4:
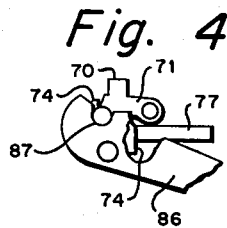
FIG. 4 is a fragmentary view of the shackle of FIG. 3 illustrating the manner of combining the cartridge-actuation and an electrical and manual actuation in the shackle.

A suspension apparatus comprising a suspension lug 12, suspension bands 13 and 13' and a release mechanism 14 are secured around the circumference of the bomb 10 with the suspension lug 12 positioned on the upper side of the bomb 10 and at a desired point along the longitudinal axis of the bomb 10 with respect to the center of the gravity of the bomb. A shear well 16 which is formed on the bomb and receives a shear pin 17 on suspension lug 12 which arrangement determines the approximate location of the suspension apparatus along the longitudinal axis of the bomb 10. The release mechanism 14 comprises connecting members shown by a release shackle 15 and a tunnel lug 20 and will be discussed in more detail with reference to FIGS. 4 and 8. The bomb 10 and apparatus are suspended in the bomb bay by a hoisting shackle 18 and a cable 19 connected to the suspension lug 12 and to a winch or other hoisting means not shown. The illustrated embodiment includes a pulley 21. The bomb 10 is prevented from moving with respect to the aircraft due to roll, yaw and pitch by a plurality of anti-sway braces 22 fixed to a bomb bay wall 23 and abutting the bomb 10. The braces 22 are adjustable in length and are preferably aligned on a radial line passing through the longitudinal axis of the bomb 10. A preferred arrangement of braces 22 consists of four braces 22; a pair on each side of lug 12 and each pair of spaced along the longitudinal axis of the bomb 10 forward and aft of the suspension apparatus. A pair of band restraining braces 24 are secured to the bomb bay wall 23 and engage bands 13 and 13' at or near the horizontal centerline of the bomb 10. The restraining braces 24 include shock pads 26, such as rubber, for the purpose of restraining the bands 13 and absorbing impact after release of the bomb 10.

The suspension bands 13 and 13' constitute one of the distinctive features of the suspension apparatus. Bands 13 and 13' each comprise a pair of parallel strips of metal, as fragmentarily shown in FIG. 2 and are pre-curved of a thin, high tensile strength, spring steel to form a circumferential envelope for the bomb. The bands 13 and 13' are joined at the bottom of the bomb 10 by release mechanism 14 and at the top by suspension lug 12. The ends of each band 13 and 13' are looped for receiving a pin retained in the release mechanism 14 or suspension lug 12. The loops are formed by folding a straight strip of band material back at each end and welding, bolting or riveting the ends to the central portion of the band which each end faces. In the embodiment shown in FIG. 1, only relatively small portions of bands 13 are folded back. Another preferred embodiment contemplates the folded back portions as being the full length of each band to give added band strength.

The cooperative relationship between the restraining braces 24 and bands 13 and 13' should now be apparent. Upon actuation of the release mechanism 14, the bomb 10 begins to drop, as shown in FIG. 1 by broken lines, forcing the release mechanism 14 to separate. The cantilever spring force of the bands 13 and 13' tend to retain the shackle 15 and tunnel lug 20 against the bomb 10. After the bomb 10 has fallen clear, the bands 13 and 13' curl back and retract the shackle 15 and tunnel lug 20 into the bomb bay of the aircraft. The restraining braces 24 decrease the moment arm of the cantilever portion of the bands 13 and 13', hence increase the retaining force at the shackle 15 and tunnel lug 20. Whiplash of the bands 13 and 13' caused by violent air turbulence in the bomb bay when open is also reduced to insure against damaging impact to sensitive aircraft structure.

Figure 2:
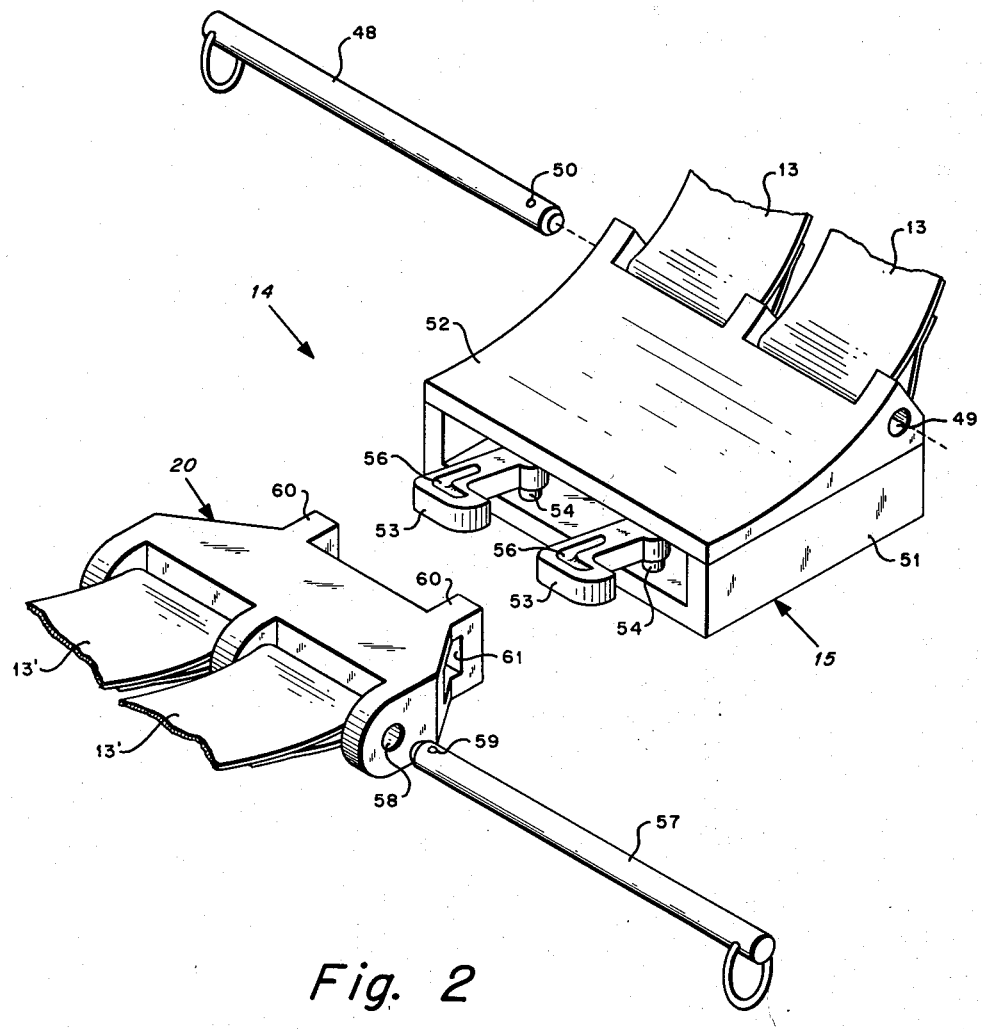
FIG. 2 is a diagrammatic isometric illustration in more detail of a release mechanism shown in FIG. 1, a shackle and a tunnel lug being shown in a release or disconnect position and pins of the release mechanism are shown removed from the shackle and the tunnel lug.

The embodiment of the release mechanism 14 of FIG. 1 is illustrated in an enlarged view in FIG. 2. The shackle 15 comprises a housing having a chassis 51 and cover 52 to which the bands 13 are connected by a shackle pin 48 inserted through three coaxially aligned shackle pin holes 49 in the cover 52. The pin is retained by a cotter pin (not shown) in a drilled hole 50. Tandem-arranged hooks 53 rotate about pivots 54 and protrude from the shackle housing. The pivots 54 are fixed to the chassis 51 and are further retained by the cover 52. The hooks 53 define a modified H-beam section at the throat cross-section 56 rather than a solid section, in order to move the centroidal axis of the section through the throat toward the pivot. The movement arm is thus reduced and lighter but stronger hooks result therefrom.

The tunnel lug 20 comprises a single casting for receiving the hooks 53. The lug 20 is connected to the bands 13' by a tunnel lug pin 57 retained in coaxially aligned tunnel lug holes 58 by a cotter pin (not shown) in drilled hole 59. Lug elements 60 each has a hole 61 therein for engaging hooks 53 of the shackle 15.

Figure 3:
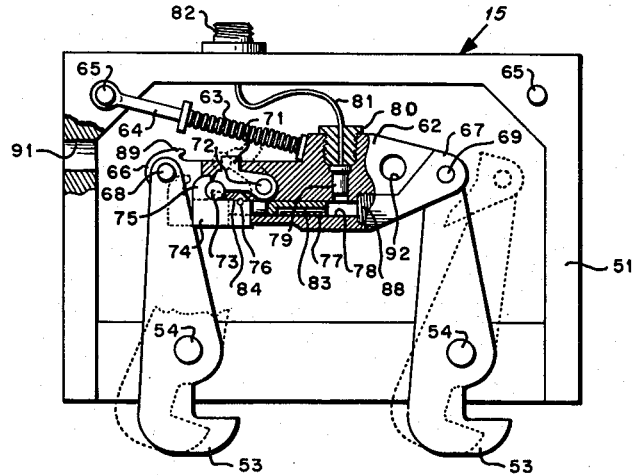
FIG. 3 is a detailed representation of the shackle of FIG. 2 showing the manner of cartridge-actuating the shackle.

FIG. 3 illustrates the shackle 15 of FIG. 2 with the cover 52 removed. For the purpose of disclosing the manner in which the shackle 15 is cartridge actuated, elements which function solely for manual and electrical actuation are omitted. The shackle elements are illustrated in the latched position by solid lines and certain elements are also partially shown in the latch-released position by broken lines. The tandem-arranged hooks 53 are simultaneously rotatable about pivots 54 by a hook linkage bar 62 having bifurcated ends 66 and 67 articulated at connecting pins 68 and 69, respectively. An accelerator spring 63 on spring guide 64, and pivoted on chassis 51 by anchor pin 65, biases the bar 62 and the hooks 53 toward the unlatched position. A bifurcated pawl 71 straddles bar 62 by means of a cross-member 70. The pawl 71 is pivotally connected at one end to the bar 62 by pawl pin 72. The other end of the pawl 71 forms riders or pawl bosses 73 extending outwardly from the sides of pawl 71. As illustrated, only one boss 73 is shown, the other being in a plane behind the drawing and coinciding with the boss shown. The pawl 71 is retained in the latched position by a bifurcated pawl retainer 74 having fingers 75 for engaging the bosses 73 of pawl 71. The retainer 74 is positioned and secured to the bar 62 by a retainer shear pin 76. The retainer 74 also includes a piston 77 in a cylinder 78. The cylinder 78 receives hot gases from an explosive charge or primer 79, retained in place by a cap 80, and electrically ignited by an ignition wire 81 having an external disconnect 82 connected to an electrical source, not shown. A dump vent 83 provides communication between the cylinder 78 and the interior of the shackle housing when the piston 77 has moved in the cylinder an amount sufficient to expose the vent 83. A cam rise 84 on retainer 74 causes the boss 73 to rotate clockwise (as shown) about pin 72 when the retainer 74 is actuated by the primer 79.

Figure 6:
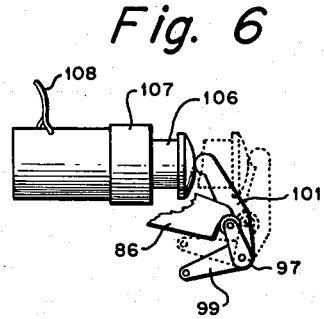
FIG. 6 is a still more detailed illustration of an electrical solenoid partially shown in FIG. 5.

Operation is such that when the primer 79 is fired, the hot gases exert a large initial force on piston 77 which is expended in shearing the pin 76. Thereafter, the piston moves retainer 74 out of engagement with pawl 71. The retainer 74 loses force when the vent 83 is exposed, but sufficient force remains to rotate pawl 71 upon contact with cam rise 84. Referring also to FIG. 6, it will be seen that the boss 73 when in the latched position also engages a sear 86 in a notch 87 for preventing the bar 62 from moving to an unlatched position. The sear 86 does not move when the primer 79 is fired, hence, the boss 73 will be cammed out of the notch 87 by the cam rise 84 on the retainer 74 when the retainer is moved toward the left, as shown. Hence, the bar 62 and the hooks 53 are biased to the releasing position shown by the broken lines.

A clean-out plug 88 provides access for cleaning the cylinder 78. Prongs 89 on each member of the bifurcated end 66 are adapted to receive a latching tool through an access hole 91. A safety hole 92 aligns with another hole (not shown) in the shackle housing for inserting a safety pin (not shown). The safetying pin is removed before the release mechanism 14 is to be actuated.

Figure 5:
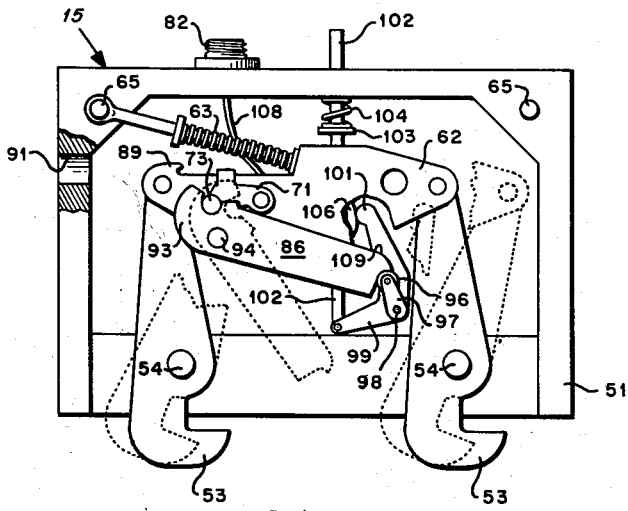
FIG. 5 is another detailed representation of the shackle of FIG. 2 showing elements for electrically and manually actuating the shackle.

FIG. 5 further illustrates the shackle 15 of FIG. 2 with the cover 52 removed. For the purpose of disclosing the manner in which the shackle 15 is manually or electrically actuated, elements which function solely for cartridge actuation are omitted. The shackle elements are illustrated in the latched position by solid lines and certain elements are also partially shown in the latch-released position by broken lines. As stated above, with reference to FIGS. 3 and 4, the bar 62 and the hooks 53 are held in the latched position by the boss 73 of pawl 71 being seated in the notch 87 of the sear 86. By the cartridge actuation shown in FIGS. 3 and 4, the bar 62 is released by rotating the pawl 71 away from the sear 86, thus clearing the boss 73 of the notches 87. In FIG. 5, however, it will be seen that the sear 86 is electrically or manually rotatable away from the pawl 71 thus clearing the notch 87 of the boss 73 to accomplish the same result, namely, of releasing the bar 62. The sear 86 is bifurcated at one end 93 in order to straddle the retainer 74 and engage the boss 73. The sear 86 is further articulated about a sear pivot 94 fixed to the chassis 51 of shackle 15 and is urged against a release roller 96 by the bias of the spring 63 transmitted to the right side of the notch 87 (as illustrated in FIG. 5). The roller 96 is rotatable at the end of a release lever 97 which in turn is articulated about a lever pivot 98 fixed to the chassis 51 of shackle 15. It is contemplated that a plurality of rollers 96 be employed for increasing the bearing surface and for reducing rolling friction. Release lever 97 is further defined by a manually actuated arm 99 and solenoid actuated arm 101 each fixed at the pivot end of the lever 97. The outer end of arm 99 is pin-connected to a manual release plunger 102 including a shoulder 103. Through plunger 102 and arm 99, a plunger spring 104 urges the release lever 97 against the sear 86. A cable, not shown, is connected to plunger 102 for manually unlatching the hooks 53.

For manual release, the plunger 102 is raised against the bias of spring 104, rotating arm 99 and lever 97 clockwise about pivot 98 thereby clearing roller 96 of the end of the sear 86. The bias of the accelerator spring 63 causes the sear 86 to free the boss 73 and permit bar 62 and hooks 53 to move to the position shown by broken lines to unlatch the tunnel lug 20 and release the bomb 10 of FIG. 1.

The bar 62 is illustrated as broken away to show the solenoid actuated arm 101 abutting a solenoid plunger 106. FIG. 8 shows the plunger 106 actuated by an electric solenoid 107 connected by a lead wire 108 to the external disconnect 82. Energization of the solenoid 107 moves plunger 106 so that arm 101 and lever 97 rotate clockwise about pivot 98 thereby clearing the roller 96 of the sear 86 and unlatching the tunnel lug 20 in a manner as described above for the manual operation.

The shackle 15 release elements are also adapted for easy latching and cocking of the hooks 53. Referring again to FIG. 3, pawl 71 and retainer 74 are manually positioned together as shown and a retainer shear pin 76 is inserted to maintain the position. The primer 79 is inserted under the cap 80. The above steps are preferably performed before installing the suspension apparatus on a store. When the shackle 15 is to be finally connected on a store, the shackle 15 and the tunnel lug 20 are joined. The hooks 53 are brought into lug element holes 61 by a latching tool which extends through the access hole 91, hooks on prongs 89 for manually pulling the bar 62 to the left. As bar 62 is pulled to the left, the boss 73 abuts the notch 87 rotating sear 86 counterclockwise about sear pivot 94. An upper surface 109 of the sear 86 contacts roller 96. Continued counterclockwise rotation of the sear 86 also dictates clockwise rotation of lever 97 to the latched position wherein the roller 96 is seated at the end of the sear 86 in the manner illustrated in FIG. 5. The latching tool can be removed from the prongs 89 permitting the spring 63 to urge the bar 62 to the right. However, movement to the right of the bar 62 is resisted by bosses 73 bearing against the right side of the notch 87 on the sear 86. Sear 86 is thus restrained from clockwise movement by the latched position of lever 97.

Alternative means for actuating the piston 77 or lever 97 are by hydraulic and pneumatic systems.

It should now be apparent that the shackle 15 incorporates two basically independent release actuations: lever and cartridge. The lever actuation is further comprised of two independent actuators: manual and electrical. The operation of each actuation, in large measure, does not depend upon the functions of the others. It should also be noted that the elements appear in duplicate to assure positive securement of a store in a suspension apparatus even though one or several of the elements should fail under heavy loads. Such a feature is vital where the store is a nuclear bomb. Notwithstanding this duality of elements, simplicity of construction is afforded.

It should be understood that the foregoing disclosure relates only to preferred embodiments of the invention and that numerous modifications and variations may be made therein without departing from the spirit and scope of the invention as set forth in the appended claims.

What is claimed is:

1. A multiplex-actuated shackle for quickly disconnecting a member therefrom comprising: a housing, hook means operable between latched and unlatched positions pivotally connected to said housing, linkage means secured to said hook means, a pawl pivotally connected at one end thereof to said linkage means and having a boss at the other end thereof, biasing means interposed between said housing and said linkage means for urging said hook means toward the unlatched position, a sear pivotally connected to said housing and engaging said boss for maintaining said latch in the latched position, a first release means operatively associated with said linkage means for disengaging said boss from said sear, and a second release means operatively associated with said housing for disengaging said sear from said boss; whereby the biasing means urges the hook means toward the unlatched position when either said boss is disengaged from said sear or said sear is disengaged from said boss.

2. A shackle as claimed in claim 1 wherein said first release means includes a piston actuated cam slidable in said linkage means, primer and igniter means arranged in such a manner that firing of said primer means drives said piston actuated cam against said boss causing said pawl to pivot out of engagement with said sear.

3. A shackle as claimed in claim 1 wherein said second selective release means includes a manually operable release plunger connected to and slidable in said housing and having roller means thereon for pivoting said sear to disengage the same from said boss.

4. A shackle as claimed in claim 1 wherein said second selective release means includes a solenoid actuated plunger slidable in said housing and operatively associated with said sear for pivoting said sear and disengaging the same from said boss.

5. A multiplex-actuated shackle for quickly disconnecting a member therefrom, comprising: a housing, two hooks arranged in tandem and extending from and pivotally supported by said housing, a hook linkage bar interconnecting said two hooks for pivoting said two hooks in unison, an accelerator spring connected between said housing and said hook linkage bar biasing said two hooks toward an unlatching position, a sear pivotally supported by said housing, said sear including a notch and a seat formed in opposite ends of said sear, a pawl pivotally supported by said hook linkage bar for engaging said sear notch when the shackle is in a latching position, a release lever pivotally supported by said housing and disposed in said sear seat for retaining said sear in a latching position, a plunger spring connected to said housing and said release lever and biasing said release lever against said sear seat, first means for selectively pivoting said pawl out of engagement with said sear notch, and second means for selectively pivoting said release lever out of engagement with said sear seat whereby the shackle will be biased to an unlatching position.

6. A multiplex actuated shackle for quickly disconnecting a member therefrom, comprising: a housing, hook means pivotally connected to said housing, said hook means being pivotal between latched and unlatched positions, biasing means for urging said hook means toward the unlatched position, sear means pivotally supported by said housing, pawl means pivotally connected to said hook means and engageable with said sear means when said hook means is in the latched position, first release means within said housing for urging said pawl means out of engagement with said sear means, second release means independent of said first release means pivotally connected to said housing and engageable with said sear means for disengaging said sear means from said pawl means whereby said hook means will be biased toward the unlatched position.

References Cited in the file of this patent
UNITED STATES PATENTS 2,956,477     Barr et al. _____ Oct. 18, 1960
3,057,625     Geffner et al. _____ Oct. 9, 1962